United States Patent Office 3,476,219
Patented Nov. 4, 1969

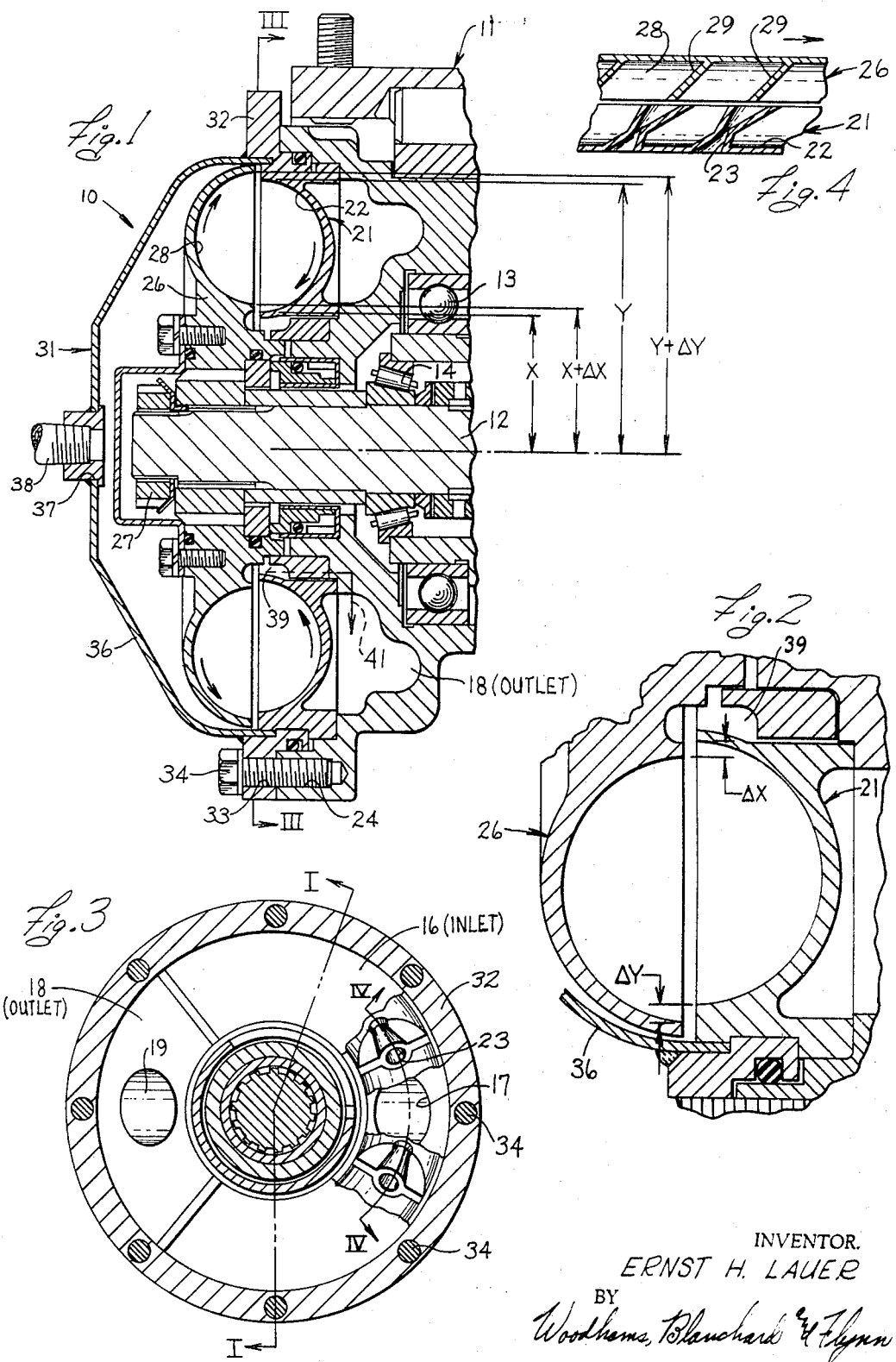

3,476,219
OVERMATCHING ROTOR TO STATOR RETARDER ARRANGEMENT TO COMBAT CAVITATION
Ernst H. Lauer, Richland, Mich., assignor to Eaton Yale & Towne Inc., Cleveland, Ohio, a corporation of Ohio
Filed Mar. 22, 1968, Ser. No. 715,362
Int. Cl. F16d 57/02, 33/20
U.S. Cl. 188—90                                    4 Claims

ABSTRACT OF THE DISCLOSURE

A hydro-kinetic retarder for retarding the rotation of a shaft having a rotor rotatable therewith and a stator axially spaced therefrom. The rotor and stator have internally facing annular concave surfaces defining a torus wherein the inner and outer radii of the concave surface on the rotor is greater than the corresponding inner and outer radii of the concave surface on the stator so that cavitation within said torus is minimized.

Field of the invention

This invention relates to a hydro-kinetic retarder mechanism and, more particularly, relates to a construction within the retarder mechanism for minimizing cavitation in the flow of liquid therein.

Description of the prior art

Cavitation has long been recognized as a problem in fluid circuits of one kind or another and is often a frequent cause of serious structural damage to pumps, propellers and other types of equipment which affect a fluid or are affected by a fluid. One such cavitation problem has existed in hydro-kinetic retarder mechanisms for automotive and similar uses.

Cavitation in the larger ones of the known hydro-kinetic retarder mechanisms, such as those of 15–20 inches in diameter, has been only a minor problem in view of the relatively low fluid velocities utilized therein and consequent small likelihood of any cavitation at all occurring therein. In a continuing effort to minimize the size of various components which are being introduced into vehicles of one kind or another, attempts have been made to reduce the size of the retarder mechanism. However, when the size of the retarder mechanism is reduced, such as to 4–6 inches in diameter, the rotor thereof has to be rotated at a much higher velocity to develop the necessary pressure within the toroid so that an effective retarding force will still be generated. With an increase in the speed of rotation of the rotor, the fluid within the toroid necessarily changes its own velocity at a faster rate so that now the cavitation problems become amplified in the smaller units and are serious, sometimes causing such structural damage as to render the retarder worthless.

In the larger retarder mechanisms cavitation is minimized sufficiently by obtaining a reasonably close match between the inner and outer diameters of the stator and rotor. That is, the closer the match, the less cavitation will appear. However, this does not as a practical matter solve the cavitation problem for smaller units where the velocities are enough higher that an amount, either in dimensional terms or percentage-wise, of mismatch which would be permissible in a larger unit creates in a smaller unit a degree of cavitation which will seriously damage, or even totally destroy, such unit.

Furthermore, the expense involved in manufacturing matching rotors and stators is high. The time required to find matching sets of rotors and stators, particularly to the accuracy required for small, high speed, units, has been excessive and has further increased the overall expense of the smaller retarder units. As a result, the industry has been faced with the problem that in spite of their greater desirability from many points of view, the smaller retarder mechanisms could not be produced at a reasonable cost. Thus, the design criteria for hydro-kinetic retarder mechanisms of the larger variety are not entirely satisfactory for the design of the smaller hydro-kinetic mechanisms and apparatus which will minimize the criticality of matched rotor and stator combinations will be advantageous.

Accordingly, the objects of the invention are:

(1) To provide a hydro-kinetic retarder mechanism which eliminates cavitation of a damaging magnitude from the toroidal flow of the hydraulic fluid therein.

(2) To provide a hydro-kinetic retarder mechanism which minimizes cavitation in the toroidal flow of the hydraulic fluid therein.

(3) To provide a hydro-kinetic retarder mechanism which minimizes cavitation in the toroidal flow of the hydraulic fluid therein particularly at the points of transfer from the rotor to the stator and from the stator to the rotor.

(4) To provide apparatus, as aforesaid, which is capable of production within standard and easily obtainable tolerances.

(5) To provide apparatus, as aforesaid, which involves less time in assembly and, therefore, results in less overall expense for the production of said retarder.

(6) To provide apparatus, as aforesaid, wherein the inner and outer diameters of the annular concave surface of the rotor and stator can vary within easily attainable tolerances without appreciably affecting the tendency to cavitation of the retarder mechanism.

(7) To provide apparatus, as aforesaid, wherein the life of the structural parts is lengthened due to the minimization of cavitation therein.

Other objects and purposes of this invention will be apparent to persons acquainted with apparatus of this general type upon reading the following specification and inspecting the accompanying drawing.

Brief description of the drawing

FIGURE 1 is a central longitudinal sectional view of a retarder mechanism embodying the invention taken along the line I—I of FIGURE 3.

FIGURE 2 is an enlarged fragmentary sectional view of a portion of the retarder mechanism illustrated in FIGURE 1.

FIGURE 3 is a partial sectional view taken along the line III—III in FIGURE 1.

FIGURE 4 is a sectional view taken along the line IV—IV in FIGURE 3.

Certain terminology will be used in the following descriptive material for convenience in reference. The words "front" and "rear" will designate directions axially to the left and to the right, respectively, of the shaft illustrated in FIGURE 1. The words "inwardly" and "outwardly" will refer to directions toward and away from, respectively, the geometric center of the device and designated parts thereof. Said terminology will include the words above specifically mentioned, derivatives thereof and words of similar import.

Summary of the invention

In general, the objects and purposes of the invention are met by providing a turbine retarder mechanism for retarding the rotation of a shaft, said turbine including a rotor rotatable with said shaft and a stator axially spaced therefrom, both of said rotor and stator having internally facing annular concave surfaces in which the inner and outer diameters of one of the concave surfaces of the rotor are greater than the corresponding inner and outer diameters of the other of said concave surfaces on the stator. By this, steps are deliberately formed between all of the adjacent edges of the two facing concave surfaces, which steps oppose the toroidal flow of fluid. It has been discovered that such predetermined deliberate offsetting does not appreciably increase turbulence but holds the tendency to cavitation within commercially acceptable limits.

Detailed description

A retarder mechanism 10 is illustrated in FIGURE 1 and generally comprises a housing 11 having an opening in the center thereof through which extends a shaft 12 rotatably supported by bearings 13 and 14. The housing 11 also has an inlet chamber 16 (FIGURE 3) which is supplied with fluid through the conduit 17. The housing 11 also has an outlet chamber 18 and a conduit 19 which removes the fluid therefrom. A plurality of threaded openings 24 are located on the front face of the housing 11.

In this particular embodiment, the stator 21 is secured to the housing 11 by any convenient means, such as the means discussed below, has an annular concave surface 22 on the front face thereof and has a plurality of of passageways 23 (FIGURES 3 and 4) formed therein which are communicable with the inlet chamber 16. The passageways 23 flare both radially and circumferentially at each of their ends in order to obtain the most efficient fluid flow into the turbine structure in accordance with well-known and accepted turbine-design techniques. This type of construction is illustrated in more detail in Patent No. 3,335,-823, issued Aug. 15, 1967.

A rotor flange 26 is secured by a nut 27 to the front end of the shaft 12 and extends radially outwardly therefrom and is axially spaced from the front surface of the stator 21 a distance which will obtain the most efficient fluid flow in the turbine structure and which is well known and acecpted in turbine-design techniques. An annular concave surface 28 is located on the rear surface of the rotor 26 opposite the forwardly facing annular concave surface 21 on the stator 13. The concave surface 28 is provided with partitions 29 (FIGURE 4) which are, in this embodiment, arranged angularly at about 45 degrees with respect to the general plane of the concave surface 28 and are related to the direction of rotation of the rotor 26 as indicated by the arrow in FIGURE 4. This type of construction is also illustrated in the aforesaid Patent No. 3,335,823.

A cap 31 is placed over the rotor and stator assembly to prevent an escape of fluid from the fluid system. The cap 31 includes an annular ring 32 which both supports a cup-shaped shell 36 and surrounds the stator 21 to clamp same to the housing 11. In this embodiment, said ring 32 has a plurality of openings 33 therein which are in alignment with the threaded openings 24 in the housing 11. A plurality of bolts 34 are receivable in the openings 33 and 24 and threadedly secure the annular ring 32 to the housing 11. The shell 36 is secured to the ring 32 by any convenient means such as welding. The center portion of the shell 36 is provided with an opening 37 therein through which extends a conduit 38 secured thereto as by welding. The conduit may be utilized in a manner similar to that shown in Patent No. 3,291,268, filed Aug. 10, 1964.

An annular chamber 39 is formed adjacent the inner diameters of the rotor 26 and stator 21. A passageway 41 indicated generally by the dotted line in FIGURE 1, connects the chamber 39 to the outlet chamber 18.

The descriptive material discussed hereinabove is considered to be conventional and forms no part of the invention. What is considered to be novel is that the inner and outer radii X and Y, respectively, of the concave surface 22 of the stator 21 is made less than the corresponding inner and outer radii "$X+\Delta X$" and "$Y+$, respectively of the concave surface 28 of the rotor 26. The differential $\Delta Y$ thus created between the outer radii of the stator is critical inasmuch as too large a differential, that is, too much overlap, tends to aggravate cavitation rather than minimize it and usually results in damage to the concave surfaces 22 and 28 adjacent the outer edges thereof. It has been found through experimentation that where the discharge from the torus is at its inner diameter a differential $\Delta Y$ in the range of $-.000$ to $+.015$ inch on a three inch radius is optimum. The differential $\Delta X$ thus created between the inner radii of the stator and rotor in the same type of unit is also critical inasmuch as too large a differential would allow too much fluid to spill over from the torus defined by the concave surfaces 22 and 28 and thus decrease the energy absorption capacity of the retarder. It has been found through experimentation that a differential $\Delta X$ in the range of $+.020$ to $+.040$ inch on a one and half inch radius is optimum. It is to be noted that the differential $\Delta X$ is somewhat greater than the differential $\Delta Y$ to provide discharge space at the ID of the torus in addition to minimizing cavitation.

It has also been observed that the size of the outlet passages 39 and 41 affect the differential $\Delta X$ in an inverse relationship. That is, the smaller the outlet, the greater the overlap must be in order to build up the required pressure within the torus for satisfactory operation of the retarder mechanism.

Where the discharge from the torus is at its OD, then the values above given for $\Delta X$ and $\Delta Y$ are reversed.

It will be recognized that the specific dimensional ranges given above are only examples of particular embodiments which have been constructed and successfully operated according to the invention. Further, these dimensional ranges will be found effective for a wide range of sizes and of requirements for manufacturing tolerances. Nevertheless, so long as the dimensional requirements herein set forth are met, referring particularly to the holding of X and Y at dimensions less than $X+\Delta X$ and $Y+\Delta Y$ respectively, variations from the specific dimensions given within the operating limits also serve above set forth may be made as need to meet other design requirements or to fit other requirements of manufacturing tolerances.

Operation

The operation of the device embodying the invention will be described in detail hereinbelow for a better understanding of the invention.

The shaft 12 of the retarder 10 is driven for rotation by any suitable device which requires a retardation of its speed. Such a device can be, for example, a transmission which forms a part of a vehicle driven by a prime mover or internal combustion engine as illustrated in the aforesaid Patent No. 3,335,823. The retarder unit may be rendered operative or inoperative at the will of the operator by suitable manual control (not shown) so that fluid is introduced into the retarder unit 10 through the conduit 17 into the inlet chamber 16. The air previously within the retarder unit 10 will be carried away by the liquid as desired, but most conveniently to a reservoir where it will bleed out by any suitable means (not shown) such as that associated with, for example, the radiator of the vehicle discussed in the aforesaid patent.

Introduction of liquid into the chamber 16 and thence through the passageways 23 will fill the torus defined by the concave surfaces 22 and 28. This will permit the rotor 26 to act against said liquid and impart energy thereto. The fluid circulates through the torus in a spiral path. It flows from the stator to the rotor at the inner diameter and from the rotor to the stator at the outer diameter as indicated by the arrows in FIGURE 1.

Since there is a difference in the respective inner and outer radii, that difference being $\Delta X$, some of the liquid is thrown out of circulation while the rest is forced to flow along the curvature of the concave surfaces 22 and 28. Since a "positive match" has been created, it is impossible for voids to form which result in cavitation. More particularly, when liquid flows from the stator 21 toward the rotor 26 at the inner radii thereof, part of the liquid passes across the gap therebetween and part of the liquid flows into the chamber 39, thence through passageway 41 to the outlet chamber 18. In the other instance where the liquid is flowing from the curved surface 28 of the rotor to the curved surface 22 of the stator at the outer radii thereof, part of the liquid continues circulating through the stator and a very small part of the liquid is expelled into the chamber defined by the shell 36 of the cap 31.

As the retarder increases in speed, a pressure builds up in the chamber defined by the cap 31 and a high torque is built up in the retarder. Therefore, by connecting the conduit 38 to a control (not shown) in a manner similar to that shown in the aforesaid Patent No. 3,291,268, the torque is reduced at high speeds while maintaining useful torque at low speeds.

Although a particular preferred embodiment of the invention has been disclosed in detail for illustrative purposes, it will be understood that variations or modifications of the disclosed apparatus, including the rearrangements of parts lie within the scope of the present invention.

The embodiments of the invention in which an exclusive property or privilege is claimed are defined as follows:

1. In a turbine retarder, the combination comprising:
   a rotatable shaft;
   a turbine for retarding the rotation of said shaft and including a bladed rotor rotatable with said shaft and a stationary bladed stator axially spaced therefrom, said rotor and said stator having internally facing annular concave surfaces defining a torus;
   fluid input means positioned intermediate the inner and outer radial extremities of said rotor and stator for supplying a working fluid to said torus during operation, said blades on said rotatable rotor and said stationary stator initiating a toroidal flow of said working fluid in said torus;
   fluid outlet means positioned at one of the inner and outer radii of said torus for permitting an egress of a portion of said working fluid from said torus during operation;
   both the inner and outer radii of the concave surface on said rotor being greater than both the corresponding inner and outer radii of the concave surface on said stator to define steps between the adjacent edges of said annular concave surfaces which oppose the toroidal flow of said working fluid in said torus whereby cavitation occurring between the torus halves upon toroidal flow of fluid therebetween is at least substantially eliminated, the difference between said radii at said one of said inner and outer radii being greater than the difference between the radii of the other of said inner and outer radii to provide adequate clearance for the egress of said portion of said working fluid therethrough, further fluid outlet means positioned at said other of said inner and outer radii for permitting an egress of the remaining portion of said working fluid from said torus.

2. The turbine retarder defined in claim 1, wherein said portion of the working fluid is discharged at the inner diameter of the torus and the differential between corresponding outer radii is in the range of —.000 to +.015 inch.

3. The turbine retarder defined in claim 1, wherein said portion of the working fluid is discharged at the inner diameter of the torus and the differential between corresponding inner radii is in the range of +.020 to +.040 inch.

4. The turbine retarder defined in claim 1, wherein the differential between corresponding radii for the portion adjacent the discharge of the torus is +0.020 to +0.040 inch and the differential of the other corresponding radii is —0.000 to +0.015 inch.

References Cited
UNITED STATES PATENTS

| | | | |
|---|---|---|---|
| 2,425,171 | 8/1947 | Bennett et al. | 188—90 |
| 2,660,970 | 12/1953 | Koskinen | 103—115 X |
| 2,696,081 | 12/1954 | Kiep | 60—54 |
| 2,748,570 | 6/1956 | Booth. | |
| 3,291,268 | 12/1966 | Nagel | 188—90 X |

FOREIGN PATENTS 921,570  3/1963  Great Britain.

GEORGE E. A. HALVOSA, Primary Examiner

U.S. Cl. X.R.
60—54; 103—96

UNITED STATES PATENT OFFICE
CERTIFICATE OF CORRECTION

Patent No. 3,476,219          Dated November 4, 1969

Inventor(s)   Ernst H. Lauer

It is certified that error appears in the above-identified patent and that said Letters Patent are hereby corrected as shown below:

Column 3, line 72, "and "Y +, respectively" should read -- and, "Y +$\Delta$Y", respectively --. Column 4, line 15, "one and half" should read -- one and a half --; line 37, cancel "serve".

Signed and sealed this 25th day of August 1970.

(SEAL)
Attest:

EDWARD M. FLETCHER, JR.          WILLIAM E. SCHUYLER, JR.
Attesting Officer                Commissioner of Patents